3,328,465
PROCESS FOR THE HYDROGENATION OF NITRO COMPOUNDS
Louis Spiegler, Woodbury, N.J., assignor to E. I. du Pont de Nemours and Company, Wilmington, Del., a corporation of Delaware
No Drawing. Original application Mar. 26, 1963, Ser. No. 267,941, now Patent No. 3,265,636, dated Aug. 9, 1966. Divided and this application Apr. 12, 1965, Ser. No. 447,526
2 Claims. (Cl. 260—580)

This application is a divisional application of copending application Ser. No. 267,941, filed Mar. 26, 1963 now U.S. Patent No. 3,265,636, issued Aug. 9, 1966.

This invention is directed to improved hydrogenation catalysts and to their use in the catalytic reduction of nitro compounds.

Hydrogenation catalysts containing platinum or palladium supported on carbon are well known. Such catalysts have been prepared by impregnating various types of carbon supports with noble metal compounds. The carbon used for such supports has been mainly porous carbon of vegetable or animal origin. Due to the high porosity of such carbons, some of the noble metal becomes trapped within the pores and thus does not contribute to the activity of the catalyst. Another disadvantage is that such porous catalysts become fouled with the products of hydrogenation. In the reduction of a nitro compound to the corresponding amine, several intermediate reduction products are formed which deposit on the catalyst and prevent further reduction from occurring in an efficient manner. As a result, large amounts of tars are formed, yields are low and the quality of the final product is poor.

In order to overcome these disadvantages, it has been proposed to use non-porous oleophilic carbon blacks as supports for the noble metal. An increase in hydrogenation rates and improved yields of higher quality products have been noted with non-porous carbon supports for the reduction of aromatic nitrobodies and polynitrotriamines as described in U.S. Patent No. 2,823,235.

It has now been discovered that, if a given quantity of a noble metal is deposited on a non-porous carbon support and admixed with a porous carbon, the rate of hydrogenation using this catalyst is about twice that of a hydrogenation process using the same amount of noble metal deposited on an all non-porous carbon support for various reductions such as: (1) reduction of nitrobodies to hydroxy amines in acid media, (Ex. 4) (2) reduction of aromatic chloro nitrobodies, without dechlorination, (3) reductive alkylation of aromatic nitrobodies with ketones, (4) reduction of aromatic nitrobodies and (5) reduction of aromatic dinitro diphenyl ethers.

It is surprising and unexpected that the addition of a porous carbon, which in itself is not as satisfactory as non-porous carbon, would produce such a considerable advantageous effect on the rate of hydrogenation. This results in a substantial saving in the cost of the expensive noble metal and provides a more economical hydrogenation process.

An added advantage to the catalyst of the present invention is that technical grade nitro compounds which normally contain very minor amounts of poisons may be very advantageously reduced therewith to give higher yields of the corresponding amino compounds.

It is, therefore, an object of this invention to provide an improved hydrogenation catalyst. It is a further object to significantly and unexpectedly increase the rate of hydrogenation of nitro compounds to the corresponding amines, hydroxyamines, chloroamines and alkylated amines.

These and other objects will become apparent from the following description and claims.

More specifically, the present invention is directed to a novel hydrogenation catalyst which comprises a non-porous carbon support having a surface area within the range of 20 to 150 sq. meters per gram, admixed with an activated, porous carbon support having a surface area within the range of 200 to 1000 sq. meters per gram and platinum or palladium or a mixture thereof deposited on the total free surface of the combined supports at a loading within the range of 0.05 to 1.0% by weight of the supports.

The present invention is also directed to a process for the hydrogenation of nitro compounds to amines using the catalyst heretofore defined. This process is also directed to the hydrogenation of nitro compounds to hydroxy amines, chloroamines and N-alkyl amines.

The metals which may be deposited on the non-porous carbon which is later mixed with porous carbon to practice this invention are platinum, palladium or a combination thereof. The hydrogenation rate may be increased with promotors or activators. It is known that the presence of additional metals, metal oxides, or even non-metallic compounds improve the performance of a catalyst in a reaction of this type. The term activation is used to indicate that the catalyst has been improved in performance by having minor amounts of metals or metal oxides, hydroxides or carbonates combined with the metal catalyst. Activation results in improved hydrogenation rates and greater catalyst life.

In the present invention, activation is obtained by utilizing the oxides or hydroxides of iron, nickel, cobalt, magnesium, aluminum, manganese, chromium, vanadium or tungsten, all of which provide an activating influence. Combinations of activators may be used. Fluorides of boron or silicon may also be used as activators. Such activator may be added before, during or after precipitation of the novel metal from solution as a hydroxide or carbonate.

The process of preparing the novel catalyst of this invention involves first suspending the non-porous, highly oleophilic carbon in copper-free water, as described in U.S. 2,823,235. An activator may be added at this point as a water-soluble solution of the activator metal salt; a solution of sodium carbonate or caustic is then added to precipitate the activator metal base carbonate or hydroxide. A solution of alkali metal bicarbonate or carbonate is added to the aqueous carbon slurry. A solution of the catalyst metal salt is added; the mass is heated to about 95° C. and held at this temperature until a test portion, when filtered, shows no catalyst metal dissolved in the filtrate. This procedure assures that all the catalyst metal has been precipitated. The mass is then reduced by the addition of aqueous formaldehyde at 95° C. or by the use of hydrogen, hydrazine, alcohol, glycerine and the like. The catalyst paste obtained after reduction may be dried. When using hydrogen, the unreduced catalyst mass is filtered off and reduction is carried out just prior to using the filtered paste for the hydrogen reduction of nitro compounds, whereby the porous carbon is added into the reduction mass.

The concentration of the catalyst metal on the non-porous, olephilic carbon support should be between about 1.0 and 10% by weight of the support.

The critical feature of this invention is the addition of a porous carbon to the non-porous carbon containing the metal catalyst. This addition consists of physical addition and mixing of a high surface, porous carbon with the catalyst paste as prepared above or with the dried catalyst. The porous carbon may be added to the reduction vessel together with the non-porous carbon-catalyst paste composition. The reactor should be equipped with an agitator which thoroughly mixes the components. The mixing, both in the dry state and in situ in the reactor distributes the catalyst metal between the non-porous and the porous carbon, thereby forming the novel catalyst of the invention. The amount of porous carbon added to the oleophilic carbon catalyst is such as to produce a catalyst having a loading of about 0.05 to 1% of the catalyst metal based on the total weight of non-porous and porous support.

The use of low concentrations or "loadings" is desirable for the hydrogenation step, but the higher concentrations are preferred for ease of catalyst preparation. It is preferred to prepare the catalyst at high concentrations with subsequent "dilutions" to lower loadings for the hydrogenation. The amount of porous carbon added will depend on the loading of the catalyst metal desired. Preferably the amount of carbon added is such as to produce loadings from 0.05 to 1% of catalyst metal based on the weight of the total carbon. This concentration has been found to be the effective range. The use of porous carbon to form the initial concentrate results in loss of catalyst in the pores and it is therefore advantageous to use non-porous carbon for the concentrate. After dilution of the concentrate with porous carbon, the catalyst metal distributes itself throughout the total carbon without clogging up the pores of the porous carbon, thereby leaving available reactive catalyst sites.

The catalyst of the present invention is quite versatile. Not only does it reduce nitro hydrocarbons, nitrohalogenated compounds and nitro ethers to the corresponding amino compounds, but it also catalyzes the hydrogenation of nitro hydrocarbons to aminophenols in acid media and alkylates as well as reduces nitroamines with ketones.

The non-porous, oleophilic carbons upon which the catalyst metal is initially deposited have surface areas ranging from 20 to 150 square meters per gram.

Representative examples are listed in the following tables.

TABLE A.—EXAMPLES OF NON-POROUS CARBONS HAVING A SURFACE AREA OF 20 TO 150 m.²/g.

| Trade Name | Surface Area, m.²/g. | Type |
| --- | --- | --- |
| Acetylene, Hiflo | 60 | Acetylene, black, 50% compressed and less structure than ordinary acetylene black. |
| Acetylene, Standard Heavy. | 60 | Acetylene black, approx. 100% compressed, approx. 14 lbs./cu. ft. |
| Acetylene, Standard Ordinary. | 60 | Acetylene black, 50% compressed, approx. 6 lbs./cu. ft. |
| Croflex 77 | 80 | Channel black (easy processing). |
| Kosmos M | 94 | Medium processing channel black (heavy compressed). |
| Kosmos T | 105 | Hard processing channel black (heavy compressed). |
| Dixie 5 | 140 | Electrical conductive channel black. |
| Sterling R | 20 | Semi-reinforcing furnace black (combustion). |
| Philblack A | 29 | High modulus furnace black (combustion). |
| Statex B | 65 | Fine particle furnace black (combustion). |
| P-33 | 23 | Fine particle furnace black (thermal decomposition). |
| Rubber Grade velvet Lampblack (Type T). | 25 | Lampblack. |
| Thermax | 19 | Medium particle furnace black (thermal decomposition). |
| Spheron No. 6 | 120 | Medium processing channel black |
| United 65 SPC | 100 | Super processing furnace black. |
| Monarch 81 | 120 | Channel black. |
| Vulcan 3 | 69 | Furnace black. |

*Porous carbons.*—The porous carbons which may be added to the non-porous carbon-catalyst composition have a surface area ranging from about 200 to 1000 square meters per gram.

TABLE B.—REPRESENTATIVE EXAMPLES OF CARBONS WITH SURFACE AREA GREATER THAN 200 m.²/g.

| Trade Name | Surface Area, m.²/g. | Type |
| --- | --- | --- |
| Darco G-60 | 600 | Activated wood charcoal. |
| Nuchar C-1000 | 1,000 | Do. |
| Nuchar WA | 600 | Do. |
| Nuchar B-100 | 700 | Do. |
| Nuchar C-115 | 700-950 | Do. |
| Nuchar C-145 | 700-950 | Do. |
| Nuchar CEE | 700-950 | Do. |
| Nuchar C-190 | 700-950 | Do. |
| Nuchar C | 700-950 | Do. |
| Lampblack Type T Activated. | 208 | Activated lampblack (treated with air at 800° F.). |
| Voltex | 281 | Conductive channel black. |
| Carbolac-1 | 920 | Channel black pigment activated. |
| Carbolac-2 | 850 | Do. |
| Carbolac-46 | 750 | Do. |
| Super Carbovar | 400 | Do. |
| Mogul | 340 | Do. |
| Mogul Special | 330 | Do. |
| Mogul B | 320 | Do. |
| Mogul A | 300 | Do. |
| Monarch 71 | 380 | Do. |
| Monarch 74 | 300 | Do. |

The following are representative examples of the preparation of the present novel catalyst and hydrogenation process for the reduction of nitro compounds utilizing this catalyst.

*Example 1*

28 parts of Shawinigan Black (100% compression) are stirred at room temperature with 700 parts of copper-free water containing 11.5 parts of sodium carbonate. The mixture is stirred and heated to 99° C. 3.5 parts of chloroplatinic acid (equal to 1.4 parts of platinum) dissolved in 75 parts of water are added dropwise over a period of 30 minutes, while holding the temperature at 99–100° C. The slurry is then held at this temperature for six (6) hours longer to assure complete precipitation of platinum values. The mixture is then cooled to 40°, diluted with 300 parts of water and the solid content of the resultant mixture is collected by filtration. The catalyst paste (140 parts) represents a catalyst concentrate having a loading of 5% Pt based on the weight of the carbon black. For use in hydrogenation systems, it is mixed with a porous carbon black as described more fully in Examples IV to X below. This example may be repeated with a loading of 5% platinum on the support with Spheron No. 6, Dixie-5 and United 65 SPC, these carbon supports having a surface area of 120, 140 and 100 meters per gram, respectively, to achieve essentially the same results.

*Example II*

10 parts of sodium chloride are dissolved at room temperature in 50 parts of water. Agitation is started and 0.84 part of palladium chloride powder (=0.505 part of palladium) are added. The mixture is stirred for 20–30 minutes at 29–30° C. until the palladium chloride is completely dissolved. This technique results in the formation of a chloropalladite solution. A solution of 0.14 part of chloroplatinic acid (equal to 0.056 part of Pt in 5.6 parts of water) is added. The mixture is stirred for 15 minutes and 150 parts of water, 1.36 parts of ferric chloride hexahydrate [or one part of ferrous chloride ($FeCl_2 \cdot 4H_2O$)], 5.6 parts of Shawinigan Black, and 30 parts of sodium bicarbonate are added. The mixture after stirring 30 minutes at 26–27° C. is heated in 15 minutes to 95° C.±1° C. and held at this temperature until a test portion of its liquors contains no dissolved precious metals. The reaction mass is then cooled to 50–60° C. and the solid content of the resultant mixture is collected by filtration. The catalyst paste [24.9 parts (22.5% solids)] is washed on the filter with 60 parts of water and represents a catalyst concentrate having a loading of 9% Pd, 1% Pt, 5% Fe^III based on the weight of the carbon. This example may be varied by substituting the non-porous carbon blacks, Thermax MT, P-33 FT and Philblack A, said blacks having a surface area of support of 6.6, 18.1 and 29.0 meters per gram, respectively; the loading on these supports is 5% palladium, 0.5% platinum and 5% Fe^III.

The catalyst paste so obtained may be dried and mixed with a porous carbon to form a catalyst composition containing 0.05 to 0.1% of catalyst by weight of carbon support. Preferably the wet catalyst paste obtained as described in the above example is added as such to the reactor vessel with an amount of porous carbon necessary to give a catalyst concentration of 0.05 to 0.1% by weight of the total carbon in the system.

*Example III*

A dispersion of 5.6 parts of a carbon black (with a surface area less than 150 m.$^2$/g.) is prepared and 15 parts of sodium bicarbonate added. The mixture is stirred at room temperature for 30 minutes and then a solution of 0.467 part of PdCl$_2$ (0.28 part Pd in 20 parts of 0.55% HCl (dissolved at 95° C.)) and 2.72 parts of $$FeCl_3 \cdot 6H_2O$$

(or 2 parts of ferrous chloride FeCl$_2$·4H$_2$O) in 50 parts of water are added. The mixture is heated to 95° C.; and either held one hour to precipitate the palladium as hydroxide; or 10 parts of 18.5% formaldehyde solution are added dropwise while stirring vigorously and held for ½ hour to precipitate the palladium as reduced metal.

In Examples II and III, the catalysts can be "activated" by using oxides or hydroxides of nickel, cobalt, magnesium, aluminum, manganese, chromium, vanadium or tungsten, instead of the oxides or hydroxides of iron as indicated. Combinations of the fluorides of boron and silicon may also be used as "activators."

The reduction of colloidal noble metals can be done by the addition of aqueous formaldehyde, or by use of hyrogen or other reducing agents such as glucose, hydrazine, alcohol, glycerine and the like.

*Example IV*

Nitrobenzene is hydrogenated in a 5-liter creased flask having four vertical creases to act as baffles and equipped with a stirrer having a vertical 5.5 inch blade, a circular lower edge and a maximum height of 1.5 inches. The stirrer is operated at 600±25 r.p.m. The flask is provided with a heating jacket, inlet and outlet tubes for hydrogen, a manometer and an inlet for introducing a solution of nitrobenzene in concentrated sulfuric acid. Into the flask are placed 1000 g. of water, 66.2 g. of 96% sulfuric acid, 2 g. of Arquad T-50 (Tallow trimethyl ammonium chloride), 2 g. of catalyst paste from Example I (which contains 0.02 g. Pt; 0.4 g. Shawinigan Black) and 1.97 g. of Carbolac-2. The catalyst loading amounts to 0.84% Pt by weight of total carbon.

The reactor is flushed with hydrogen and heated to 90° C. A mixture of 94 g. of nitrobenzene and 38.7 g. of 96% sulfuric acid is added to the flask at a rate of 1.6 to 1.8 ml./min. while at the same time adding hydrogen at such a rate that the pressure in the flask remains essentially constant. The temperature is maintained by external cooling at 92–93° C. and the total pressure at 760 mm., the partial pressure of hydrogen being about 200 mm. The sulfuric acid added with the nitrobenzene is equivalent to the basic reduction products formed, so that addition of the mixture to the flask produces no change in the overall acidity.

Hydrogen is absorbed at a rate of 1.5 cu. ft. per hour. The nitrobenzene is added in 60 minutes. The solution then contains 66.7 g. of p-aminophenol and 12.8 g. of aniline, equivalent to yields of 81.7% and 19.3%, respectively.

By following the details of Example IV using a catalyst containing 0.42% Pt by weight of carbon support, hydrogen is absorbed at the rate of 1.51 cu. ft. per hour giving a yield of 77.6% of p-aminophenol.

A catalyst prepared according to the method described in U.S. 2,285,277, containing less than 1% Pt by weight of porous carbon support is inactive in the process of Example IV, if the surface area exceeds 600 m.$^2$/g. (see Table VI for results with 1% Pt on Darco-G60).

Catalysts containing 1% Pt (formaldehyde reduced) prepared according to U.S. 2,285,277 by direct deposition of the catalyst metal onto a non-porous carbon black having a surface area less than 150 m.$^2$/g. are less active than the catalysts of the invention prepared by the distribution or addition of porous carbon to non-porous catalyst support (see Table VII).

Similarly, a catalyst prepared according to U.S. 2,823,235 by dilution of non-porous carbon support with additional non-porous, low surface area carbon is less active than the catalyst of the invention (see Tables II and IV).

The following tables list the results obtained with various porous carbons added to a catalyst paste, prepared as in Example I, in the hydrogenation of nitrobenzene to produce p-aminophenol.

Table I-A shows the activities produced with the carbon surface area extended to 1700 m.$^2$/liter of reaction solution, using 0.02 g. Pt in hydrogenations of nitrobenzene at 85° C.

Table I-B shows the results obtained at 0.5% Pt loading (0.015 g. Pt) using a fixed amount of various porous carbons in hydrogenations at 90° C.

Using 2 g. catalyst paste of Example I, 5% Pt on Shawinigan Black (dry basis) containing 0.02 g. Pt; 0.4 g. Shawinigan Black (24 m.$^2$ surface area). Total surface area extended to 1700 m.$^2$ with substrates listed below.

TABLE I-A.—DILUTION OF 5% PT ON SHAWINIGAN BLACK (EXAMPLE I) WITH VARIOUS POROUS CARBON SUBSTRATES (TYPE B)

[Reduction temperature 85° C.; 600 r.p.m. agitator speed]

| Substrate | | | | Reduction Rate | | | p-Aminophenol | |
|---|---|---|---|---|---|---|---|---|
| Name | M.$^2$/g. | Wt. g. Added | Final Percent Pt Load | H$_2$ absorp., cu. ft./hr. | Ml. Feed per Min. | Min. Mole Nitrobenzene | Percent Yield | Lb./hr./gal. |
| Darco G-60 | 600 | 2.8 | 0.63 | 1.70 | 2.16 | 61.0 | 75.5 | 0.71 |
| Nuchar C-1000 [1] | 1,000 | 1.7 | 0.95 | 1.40 | 1.67 | 80.0 | 81.0 | 0.58 |
| Mogul Special | 330 | 5.1 | 0.37 | 2.15 | 2.50 | 53.0 | 73.8 | 0.79 |
| Mogul A | 300 | 5.6 | 0.33 | 2.20 | 2.70 | 50.0 | 76.6 | 0.88 |
| Carbolac-1 | 920 | 1.82 | 0.90 | 2.30 | 2.70 | 50 | 76.0 | 0.87 |
| Carbolac-2 | 850 | 1.97 | 0.84 | 2.33 | 2.70 | 49 | 71.5 | 0.81 |
| Voltex | 280 | 6.0 | 0.31 | 1.54 | 2.00 | 67 | 81.0 | 0.69 |

[1] Platinum deposited on Nuchar by method of U.S. Patent No. 2,285,277 was inactive.

Using 1.5 g. catalyst paste, Example I, 5% Pt on Shawinigan Black containing 0.015 g. Pt; 0.3 g. Black (18 m.² surface area). Extended to 0.5% Pt loading with substrates (2.7 g.) listed below.

TABLE I-B.
[Reduction temperature 90° C.; 600 r.p.m. agitator speed]

| Substrate | | | Reduction Rate | | | p-Aminophenol | |
|---|---|---|---|---|---|---|---|
| Name | M.²/g. | Total Surf. Area, m.² | H² absorp., cu. ft./hr. | Ml. Feed per Min. | Min./ Mole Nitrobenzene | Percent Yield | Lb./hr./ gal. |
| Super Carbovar | 400 | 1,088 | 2.10 | 2.4 | 57 | 63.4 | 0.63 |
| Carbolac 46 | 750 | 2,043 | 1.65 | 2.0 | 67 | 79.4 | 0.68 |
| Monarch 71 | 380 | 1,048 | 2.40 | 2.8 | 48 | 72.5 | 0.88 |

By following the procedure of Example IV, the following nitro compounds are hydrogenated to p-hydroxyamines:

o-Nitrotoluene to 4-amino-3-methylphenol
1-nitronaphthalene to 4-aminonaphthol
o-Chloronitrobenzene to 4-amino-3-chlorophenol
m-Chloronitrobenzene to 4-amino-2-chlorophenol
2-nitrobiphenyl to 2-amino-5-hydroxybiphenyl

*Example V*

A nickel-clad autoclave, jacketed for heating or cooling with circulating water and equipped with baffles and efficient agitation, is charged with: 2000 parts 3,4-dichloro-1-nitrobenzene; 100 parts of water; 20 parts of morpholine; 3 parts of catalyst paste of Example I (equal to 0.03 part of platinum as hydroxide and 0.6 part of Shawinigan Black) and 3 parts of Carbolac-2.

The quantity of morpholine employed corresponds to 1% of the weight of nitrobody; that of the catalyst to 1 part platinum to 66,000 parts of nitrobody. (Note: 1 part Pt to 200,000 parts nitro is also effective.)

Air in the autoclave and lines is then displaced by pressurizing with nitrogen and releasing the pressure through the vent system. The autoclave is then pressurized to 500 p.s.i.g. and allowed to stand without agitation for 20 minutes to assure a gas tight system. The nitrogen is then displaced with hydrogen by successive pressurizing to 100 p.s.i.g. and venting to zero p.s.i.g. The temperature of the circulating water in the jacket is adjusted to 60° C.; the agitator started; and the hydrogen pressure is increased to 200 p.s.i.g. The charge absorbs hydrogen rapidly with the evolution of heat. The temperature of the charge rises to 75° C., with the cooling bath temperature held constant at 60° C. The autoclave is repressurized to 200 p.s.i.g. after each 100 lb. drop in pressure. After 100 to 109 minutes no further rapid hydrogen absorption is noted. The charge is then heated to 95° C., and held at 500 p.s.i.g. for 30 minutes longer to assure complete reduction.

The hot reduction mass is then filtered, the filtrate allowed to settle at 80 to 85° C., and the layers separated. The water layer (470 parts) has a pH of 8.4 and contains 0.42 g. chloride ion per 100 parts, which represents a 0.5 mole percent dechlorination.

The dichloroaniline layer is dehydrated by heating at 100±10° at 20 mm. of Hg to yield a 98.8% pure product 3,4-dichloroaniline, having a freezing point of 71.1° C. Substitution in Example V of three parts of low surface area (60 m.²/g.) Shawinigan Black for the three parts of Carbolic-2 (850 m.²/g.) gives a much slower reduction cycle.

Table II summarizes the results obtained using 0.03 and 0.02 part of platinum per 2000 parts of 3,4-dichloronitrobenzene and 20 parts of morpholine using 5% Pt on Shawinigan Black diluted with (1) Shawinigan Black to 0.83% Pt loading and with (2), and (3) Carbolac-2 to 0.83% and 0.59% Pt.

The extension of concentrated catalyst with Carbolac-2 results in a 2.3 fold increase in the reduction rate with no appreciable increase in the mole percent dechlorination, and with a decrease in the percent of HCl insolubles.

With the Shawinigan Black dilution (1), the hydrogen pressure starting at 200 p.s.i.g. and 60° C. temperature had to be increased in the first 30–45 mins. to 500 p.s.i.g. and 90° C. to maintain the rate of hydrogen absorption, and it requires (4) four hrs. to effect complete reduction. With the Carbolac-2 dilution, the absorption occurred rapidly at 200 p.s.i.g. pressure, and only a temp. increase was needed to effect completion in 1.8 hours.

TABLE II.—3,4-DICHLOROANILINE BATCH HYDROGENATIONS PT, MORPHOLINE (2,000 PARTS 3,4-DICHLORO-1-NITROBENZENE) EFFECT OF DILUTIONS WITH SHAWINIGAN BLACK AND CARBOLAC-2

| Part Pt | Dilution with— | Percent Pt Loading | Reduction Time, Minutes | Finished Reduction | | Isolated 3,4-dichloroaniline | | | |
|---|---|---|---|---|---|---|---|---|---|
| | | | | pH | Mole Percent Dechlor. | Percent Purity [1] | Percent HCl insol. | F.P., ° C. | Percent NO₂ [2] |
| 0.03 | Shaw. Black | 0.83 | 249 | 8.7 | 0.45 | 98.3 | 0.52 | 70.6 | <0.01 |
| 0.03 | Carbolac-2 | 0.83 | 109 | 8.4 | 0.54 | 98.9 | 0.28 | 71.2 | 0.03 |
| 0.02 | Carbolac-2 | 0.59 | 180 | 8.2 | 0.71 | 98.7 | 0.96 | 70.5 | 0.03 |

[1] By VPC Analysis.  [2] By TiCl₃ Titration.

The following compounds may also be used as halogen suppressors in Example V in place of morpholine-piperazine, N-methyl and N-ethyl morpholine, and magnesium oxide.

By following the procedure of Example V, the following chloronitro compounds may be reduced:

4-chloro-3-nitrotoluene
2-chloro-4-nitrotoluene
2,5-dichloro-1-nitrobenzene
o-, and p-chloronitrobenzenes
1-bromo-4-nitrobenzene
1-fluoro-4-nitrobenzene
2-chloro-4-nitroaniline
4-chloro-2-nitroanisole
2-chloro-4-nitrobenzoic acid
6-chloro-2-nitrobenzoic acid, Na salt, and
4-chloro-3-nitrobenzene sodium sulfonate.

Example VI

A steel or nickel-clad pressure reactor, which is jacketed for heating or cooling with water, and which is equipped with baffles and an efficient agitator which rotates at 450 r.p.m., is used for the hydrogen reduction. The reactor is charged to about 20–25% of its capacity with 700 parts of 3,4-dichloroaniline at 75–85° C., 140 parts of water, 10 parts of morpholine, 5 parts of catalyst paste of Example I (equal to 0.05 part of platinum as hydroxide and 1 part of Shawinigan Black) and 15.7 parts of Carbolac–2. The autoclave is then pressurized with hydrogen to 140 p.s.i.g. and the agitator is started. The temperature of the circulating bath is adjusted to 93±2° C. Molten 3,4-dichloro-1-nitrobenzene is then injected under pressure in portions of approximately 59 parts each. As the nitrobody is reduced, a drop in pressure is observed due to consumption of the hydrogen. An external reservoir limits this pressure drop to about 10 p.s.i. This pressure drop is also accompanied by a rise in temperature. The temperature is controlled between 90–110° during the reaction by circulating the water at 90±5° C. through the jacket. After each portion of nitrobody is reduced, the system is repressurized with hydrogen to 140 p.s.i.g. prior to adding another portion of nitrobody. In this manner, each portion of nitrobody is completely hydrogenated before adding the next portion. The time required to reduce each portion of nitrobody is observed and the rate of reduction at 135 p.s.i. (average)—parts of 3,4-dichloro-1-nitrobenzene reduced per minute per part of platinum is calculated (g. nitro/min./g. Pt)—e.g. by dividing the weight of nitrobody by the product of time required for its hydrogenation by the weight of platinum used.

The above hydrogenation process can be operated continuously by removing portions intermittently and recycling the catalyst, or it can be run semi-continuously, by feeding nitrobody until the autoclave is filled to 65–75% capacity.

3,4-dichloroaniline is isolated as described in Example V.

Rates of reduction obtained with additions of Carbolac–2 to platinum loadings from 0.3 to 0.8% using 0.05 part of Pt/2000 parts of nitrobody are compared in Table III with 5% Pt on Shawinigan Black undiluted. The rate increases with increase in Carbolac–2 added.

TABLE III.—EFFECT OF ADDITION OF CARBOLAC–2

| Parts Carbolac-2 Added | Percent Pt Loading | Reduction Rate— part nitro/min./ part Pt |
|---|---|---|
| 0.0 | 5.0 | 360 |
| 5.0 | 0.83 | 590 |
| 9.0 | 0.50 | 710 |
| 15.7 | 0.30 | 750 |

Example VII

Reduction rates from dilutions with Carbolac–2 (850 m.$^2$/g.), Mogul A (300 m.$^2$/g.), and Shawinigan Black (60 m.$^2$/g.) using 0.03 g. Pt at 0.3% Pt loadings are illustrated in Table IV. The effect of the large surface area is pronounced.

TABLE IV.—DILUTION OF 5% PT ON SHAWINIGAN BLACK (EXAMPLE I) 0.3% PT LOADING; 0.03 g.

| Diluting Carbon | Reduction Rate— part nitro/min./ part Pt | 3,4-dichloroaniline | |
|---|---|---|---|
| | | Mole percent Dechlor. | F.P., °C. |
| Carbolac-2 | 870 | 0.89 | 71.3 |
| Mogul A | 685 | 0.52 | 70.2 |
| Shawinigan Black | 500 | 0.62 | 70.5 |

A 400 ml. Hastelloy pressure tube bomb mounted in a Shaker Machine is charged with 59 g. of p-nitroaniline, 127 g. of methylethyl ketone, 0.22 g. of catalyst paste (equivalent to 0.004 g. Pt, and 0.08 g. of Dixie–5 on a dry basis), 0.32 g. of Carbolac–2, 3.4 ml. of water and 0.1 ml. of 85% phosphoric acid are charged into the bomb and the equipment is tested at 600–700 p.s.i.g. with nitrogen. The nitrogen pressure is then vented and replaced with hydrogen by repeated pressurizing at 300 p.s.i.g. followed by venting to zero p.s.i.g. 500 p.s.i.g. hydrogen pressure is then applied to system while heating to 100° C. The hydrogenation is controlled manually at 400–500 p.s.i.g. H$_2$ pressure. The initial hydrogen absorption is rapid, and there are 15–17 100 lb. drops in pressure in about 10–12 min. This is accompanied by a rapid rise in temperature from 100–500° C. When this initial temperature kick subsides, heat is applied to maintain the temperature at 175°±3° C., while holding the hydrogen pressure at 400–500 p.s.i.g. until no further absorption occurs. The total time for hydrogenation is four hours.

The bomb is cooled to 30±5° C., opened and the liquid two-layer system removed by decantation. The charge is filtered to separate catalyst; the water layer (33.5 g.) separated; and the methylethyl ketone solution of the alkylated diamine is concentrated by distillation to 130±5° C. at 10 mm. Hg to recover the excess methylethyl ketone. The crude concentrate 93.0 g. (calc. yield: 94 g. M.W. 220) is finally vacuum distilled at 115°±5° C./1.±0.2 mm. Hg to obtain pure N,N'-di(sec. butyl)-p-phenylenediamine.

The results when 1% Pt on Darco G60 (prepared as described by Henke et al., in U.S. 2,285,277) is scubstituted for the catalyst in Example VIII are not as satisfactory (see Table VIII). The Darco supported catalyst is less active and does not filter as readily.

The use of 1% Pt on only non-porous Shawinigan Black as support, resulted in the exclusive formation of p-phenylene-diamine. None of the desired alkylated product was formed.

Ketones having the formula $$RCOR_1$$

wherein R and $R_1$ have 1 to 4 carbons and are alike or different may be utilized in the place of methylethyl ketone of this example. P-nitroaniline remains as the other reactant.

Example IX

The procedure described in Example VI is also used for the continuous hydrogenation of orthonitrotoluene to produce orthotoluidine.

In this process, orthonitrotoluene is injected in portions of 58 parts each under pressure 140 p.s.i.g. H$_2$ to an agitated slurry at 450 r.p.m. of 750 parts of orthotoluidine, 250 parts of water, 3 parts of catalyst paste containing 4.5% Pd; 0.5% Pt; 5% Fe$^{III}$ as hydroxides on Shawinigan Black (equivalent to 0.03 g. Pd-Pt; 0.6 g. Shawinigan Black) and 9 g. of Carbolac–2 at 100±10° C.

The rate of reduction under these conditions is 800 g. orthonitrotoluene/min./g. Pd-Pt.

Comparative rates obtained from various additions of porous carbons to a catalyst paste containing 4.5% Pd; 0.5% Pt; 5% Fe$^{III}$ on Shawinigan Black are shown in Table V.

TABLE V.—EFFECT OF ADDITION OF CARBOLAC–2 ON ORTHONITROTOLUENE REDUCTION 0.03 G. Pd-Pt

| G. Carbolac-2 Added | Percent Pd-Pt Loading | Reduction Rate— Part ONT/Min./ Part Pd-Pt | Catalyst Life Percent Activity | Percent NO$_2$ in O-toluidine |
|---|---|---|---|---|
| 0.0 (Control) | 5.0 | Initial: 640 Final: 175 | 28 | 0.02 |
| 9.0 | 0.31 | 800 | 100 | 0.06 |
| 5.4 | 0.5 | 890 | 100 | 0.01 |
| 2.4 | 1.0 | 750 | 100 | 0.01 |

Other nitro compounds which may be hydrogenated to the corresponding amines by the method described in the above examples are the following:

m-Dinitrobenzene
2,4-dinitrotoluene
2,6-dinitrotoluene
Nitrobenzene
2-nitropropane
Nitrocyclohexane
2,4,6-trinitrotoluene
Beta-nitronaphthalene
p-Nitroanisole.

*Example X*

A pressure autoclave equipped with cooling coils and an efficient agitator is charged with 1100 parts of n-butyl alcohol, 100 parts of 4,4'-dinitrodiphenylether, and a catalyst mixture consisting of catalyst paste containing 0.011 parts of platinum as hydroxide on 0.21 part of Shawinigan Black (prepared as described in Example I), and 2.6 parts of Carbolac-2.

The mixture, after displacing the air in the system with hydrogen as described in Example V, is hydrogenated at 100–130° C. at 300–500 p.s.i. hydrogen pressure. The hydrogenated product is filtered from the catalyst, and the clarified filtrate is cooled to obtain crystals of pure white 4,4'-diaminodiphenylether.

The addition of Carbolac-2 to 5% Pt on Shawinigan Black results in a several fold acceleration in rate, while using one-half the quantity of platinum, e.g. 1 troy oz. of platinum instead of 2 troy oz. of platinum/1000 parts of 4,4'-dinitrodiphenylether.

The novel catalysts of the present invention comprising a mixture of low surface area, non-porous carbon and high surface area, porous carbon as the support for the noble metal produce a considerable increase in the rate of hydrogenation of nitro compounds to amines, hydroxy amines, chloroamines and alkylated amines. This several fold unexpected increase results in a direct saving in the amount of expensive platinum and/or palladium metal necessary to reduce the same amount of nitro compound with known catalysts.

Other dinitrodiphenyl ethers which may be reduced in the practice of this invention include: 2,4'-dinitro-4-methyldiphenyl ether, 3,4'-dinitrodiphenyl ether, 2,2'-dinitrodiphenyl ether, 2,3'-dinitrodiphenyl ether, 2,4'-dinitro-3-methyl-5-methoxydiphenyl ether and 4,4'-dinitro-2-ethyldiphenyl ether.

The following data set forth comparative performances of the catalysts of the prior art which performances substantiate the unexpected significance of the heretofore described novel catalysts of the present invention. The tables referred to are those tables preceding this data.

*Results from direct preparation of 1% Pt loadings on high surface area carbons.*—Catalysts containing 1% Pt (formaldehyde reduced) prepared directly by the procedure described in U.S. 2,285,277 on high surface area supports (type B carbons) such as Darco G–60, Nuchar C–1000 and Carbolac-2 are less active than the concentrated catalysts of Example I diluted with the type B carbons.

1% Pt ($CH_2O$ reduced) on Carbolac-2 (850 m.$^2$/g.) or on Nuchar C–1000 (1000 m.$^2$/g.) is totally inactive, as previously indicated. Results from 1% Pt on Darco G–60 (600 m.$^2$/g.) are shown in Table VI. This catalyst is considerably slower, e.g. less active, than diluted catalysts prepared by redistribution of noble metal values from a low surface area support to a larger surface area as described in Example IV (compare Table I with Table VI).

TABLE VI.—DARCO G-60 SUPPORT (SURFACE AREA m$^2$./g.=600)

[Catalyst prepared from chloroplatinic acid, alkali, and formalin as described in U.S. 2,285,277]

| Agitator Speed, r.p.m. | Red. Temp., °C. | Catalyst | | | Reduction Rate | | | p-Aminophenol | |
|---|---|---|---|---|---|---|---|---|---|
| | | G. Pt | G. C | Percent Pt Load. | H$^2$ Absorp., cu. ft./hr. | Ml. Feed/ Min. | Min./ Mole Nitrobenzene | Percent Yield | Lb./hr./ gal. |
| 700 | 85 | 0.01 | 1.0 | 1.00 | 0.55 | 0.55 | 240 | 76.3 | 0.19 |
| 600 | 75 | 0.02 | 2.0 | 1.00 | 0.88 | 0.85 | 118 | 56 | 0.26 |
| 800 | 85 | 0.01 | 1.0 | 1.0 | 0.90 | 1.00 | 133 | 73.5 | 0.27 |

*Results from direct preparation of 1% Pt loadings on low surface area carbon blacks.*—1% Pt (reduced metal form) prepared directly onto carbon blacks (U.S. 2,285,277) with surface areas less than 150 m.$^2$/g. (type A carbon blacks) are less active than the catalysts obtained by the distribution (or "dilution") technique. Results are shown in Table VII (compare with Table I).

TABLE VII.—1% PT (REDUCED METAL FORM) ON TYPE A CARBONS SUPPORTS (SURFACE AREA 60-120 m.$^2$/g.)

[Reduction temperature 85° C., agitator speed 800 r.p.m.]

| Carbon Support | Reduction Rate | | | p-Aminophenol | |
|---|---|---|---|---|---|
| | H$^2$ Absorp., cu. ft./hr. | Ml. Feed/ Min. | Min./ Mole Nitrobenzene | Percent Yield | Lb./ hr./ gal. |
| Shawinigan Black (60 m.$^2$/g.) | 0.65 | 0.77 | 172 | 71.0 | 0.19 |
| Spheron No. 6 (120 m.$^2$/g.) | 1.00 | 1.14 | 117 | 71.5 | 0.29 |

Table VIII shows the results obtained with 1% Pt on Darco G-60 (prepared as described in U.S. 2,285,277) compared with those of Example VIII.

TABLE VIII.—REDUCTIVE ALKYLATION OF p-NITROANILINE WITH METHYL ETHYL KETONE 0.004 g. PT/59 g. PNA

| Catalyst Support | | Reduction Time, Hours | Filtration Time, Minutes | Weight Yield Grams Dialkyl PPD | Percent PPD Equiv. (a) | Crude Concentrate VPC Analysis | |
|---|---|---|---|---|---|---|---|
| Name | G. | | | | | Percent PPD | Percent Purity Diaklyl PPD |
| Darco G-60 | 0.4 | 6.25 | 60 | 91.2 | 0.9 | 0.00 | 98.1 |
| Dixie-5 | 0.08 | 4.0 | 24 | 93.0 | 0.1 | 0.04 | 99.8 |
| Carbolac-2 | 0.32 | | | | | | | a Percent PPD Equivalent: By Indophenol formation. Blue color formation with phenol and caustic soda. PPD = p-phenylenendiamine.

It is thus clear that the herein described and claimed invention represents a novel and unexpected contribution to the art.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for the hydrogenation of nitro compounds to their corresponding amines which process comprises utilizing a hydrogenation catalyst consisting essentially of a non-porous carbon support having a surface area within the range of 20 to 150 square meters per gram, said non-porous carbon support being admixed with an activated, porous carbon support having a surface area within the range of 200 to 1000 square meters per gram, a noble metal selected from the group consisting of platinum, palladium and mixtures thereof being deposited on the total free surface of said admixed supports at a loading within the range of 0.05 to 1.0% by weight of said weight.

2. A process according to claim 1, wherein nitrobenzene is hydrogenated.

No references cited.

CHARLES B. PARKER, *Primary Examiner.*

JOSEPH P. BRUST, *Examiner.*

R. V. HINES, *Assistant Examiner.*